US008178063B2

(12) United States Patent
Ahn et al.

(10) Patent No.: US 8,178,063 B2
(45) Date of Patent: May 15, 2012

(54) FABRICATION METHOD OF ZEOLITE HONEYCOMB TYPE CATALYST FOR REDUCING NITROGEN OXIDE

(75) Inventors: Junseong Ahn, Daejeon (KR); Bongjae Kim, Daejeon (KR); Sangho Lee, Daejeon (KR); Okyoun Kim, Daejeon (KR); Seunghoon Oh, Seoul (KR)

(73) Assignee: SK Innovation Co., Ltd., Seoul (KR)

( * ) Notice: Subject to any disclaimer, the term of this patent is extended or adjusted under 35 U.S.C. 154(b) by 161 days.

(21) Appl. No.: 12/863,024

(22) PCT Filed: Dec. 24, 2008

(86) PCT No.: PCT/KR2008/007642
§ 371 (c)(1),
(2), (4) Date: Jul. 15, 2010

(87) PCT Pub. No.: WO2009/093811
PCT Pub. Date: Jul. 30, 2009

(65) Prior Publication Data
US 2011/0044873 A1    Feb. 24, 2011

(30) Foreign Application Priority Data
Jan. 21, 2008   (KR) .................. 10-2008-0006141

(51) Int. Cl.
*B01D 53/56* (2006.01)
*B01D 53/94* (2006.01)
*C01B 39/00* (2006.01)
(52) U.S. Cl. .................. 423/213.2; 423/239.2; 423/700; 423/716; 60/299; 60/301; 502/60
(58) Field of Classification Search .......... 60/299, 60/301; 423/213.2, 239.2, 700, 716; 502/60
See application file for complete search history.

(56) References Cited

U.S. PATENT DOCUMENTS

| 3,557,024 | A | 1/1971 | Young et al. |
|---|---|---|---|
| 4,579,831 | A | 4/1986 | Field |
| 5,116,586 | A | 5/1992 | Baacke et al. |
| 5,244,852 | A | 9/1993 | Lachman et al. |
| 5,354,720 | A | 10/1994 | Leyrer et al. |
| 5,378,671 | A | 1/1995 | Keville et al. |
| 5,587,134 | A | 12/1996 | Dannevang |
| 6,652,759 | B2 | 11/2003 | Taira et al. |
| 2004/0097362 | A1 | 5/2004 | Addiego |
| 2011/0044873 | A1* | 2/2011 | Ahn et al. .................. 423/239.2 |

FOREIGN PATENT DOCUMENTS

| EP | 0485179 A2 | 5/1992 |
|---|---|---|
| EP | 0593904 A1 | 4/1994 |
| EP | 0972748 A1 | 1/2000 |
| JP | 7053208 A | 2/1995 |
| JP | 8173766 A | 7/1996 |
| JP | 2001293480 A | 10/2001 |
| KR | 1020040063630 A | 7/2004 |
| WO | 0147634 A1 | 7/2001 |

* cited by examiner

*Primary Examiner* — Timothy Vanoy
(74) *Attorney, Agent, or Firm* — The Webb Law Firm

(57) ABSTRACT

The present invention relates to conversion of exhaust gas containing nitrogen oxide ($NO_x$) such as NO, $NO_2$ and $N_2O$ into $N_2$ and $H_2O$ through catalytic reaction with injection of a reducing agent such as ammonia and urea. A fabrication method of zeolite honeycomb type catalyst for reducing nitrogen oxide of the present invention includes: (a) obtaining an inorganic binder by mixing and uniformly peptizing pseudo-boehmite, distilled water and a pH adjuster; (b) obtaining a paste by mixing and kneading zeolite, the inorganic binder, an organic binder and distilled water; (c) extruding the paste into an extrudate having a through pore of a regular structure; and (d) drying and heat treating the extrudate.

16 Claims, 5 Drawing Sheets

[Figure 1]
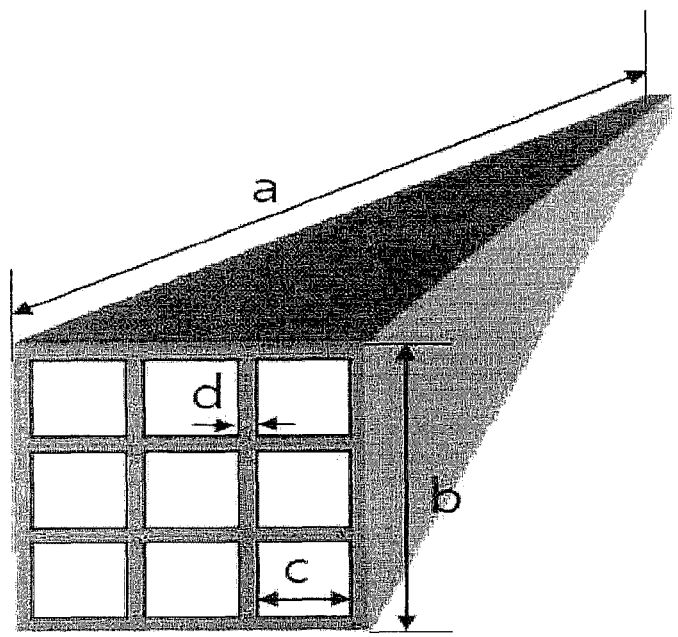
[Figure 2]
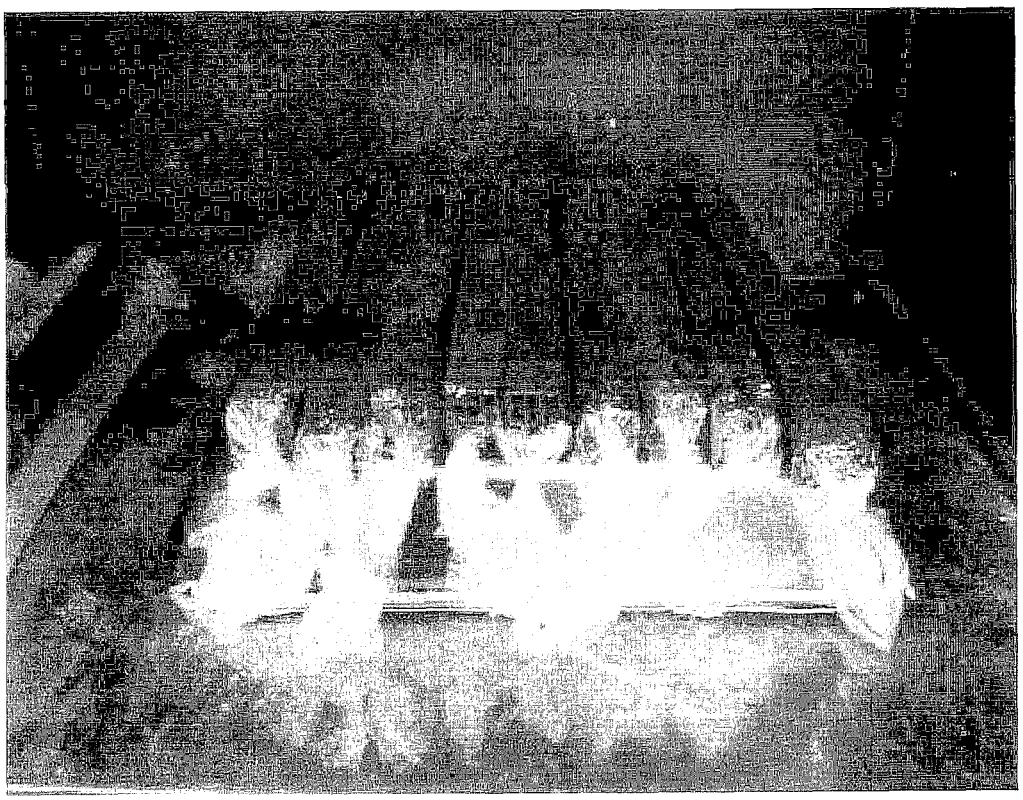

【Figure 3】
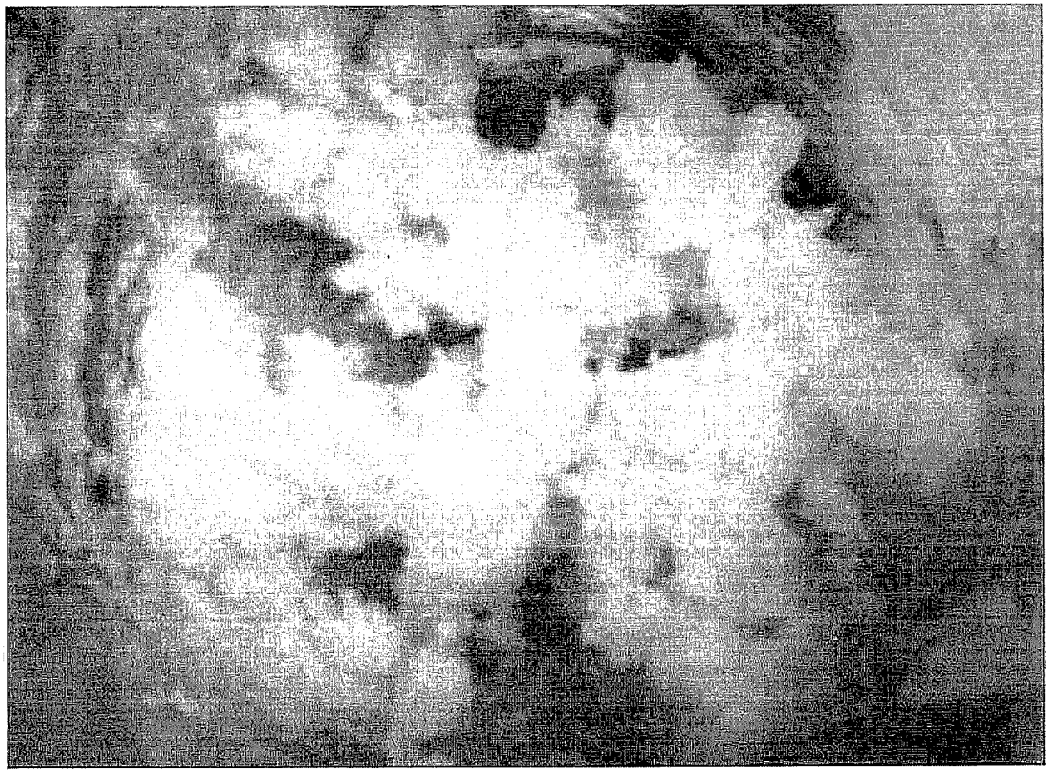
【Figure 4】
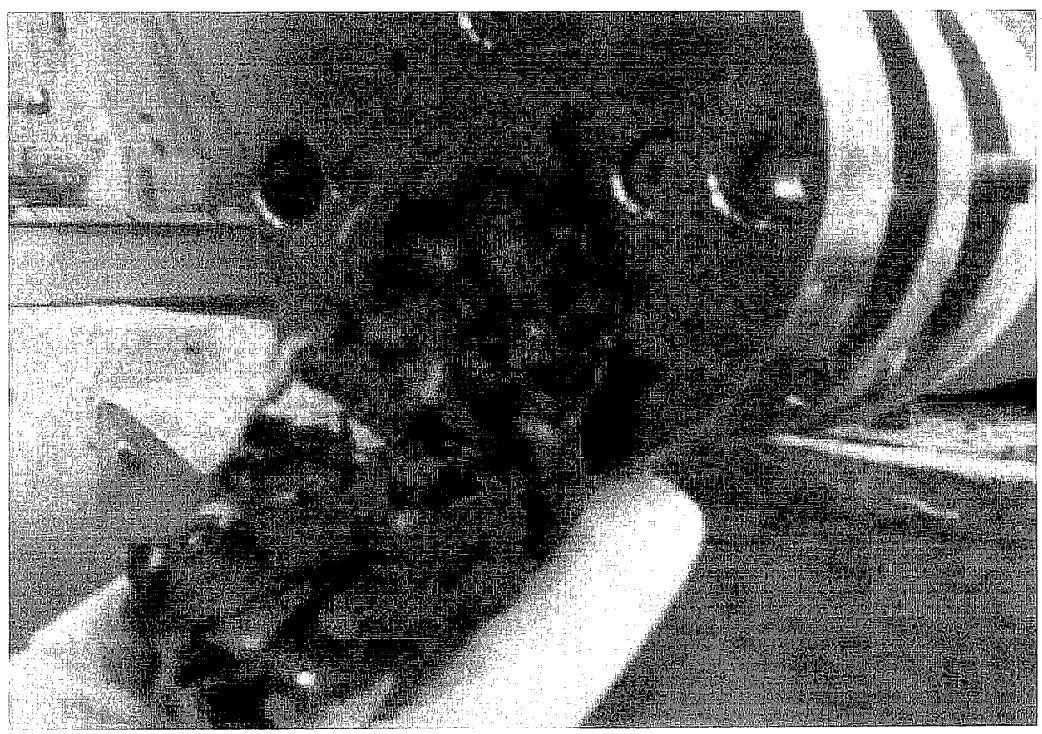

[Figure 5]
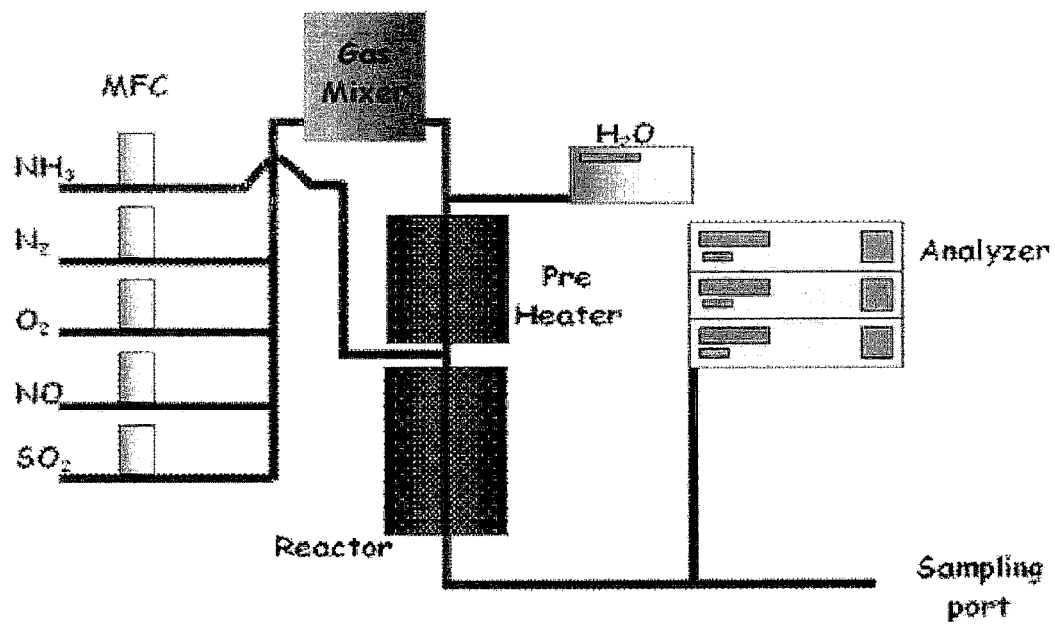
[Figure 6]
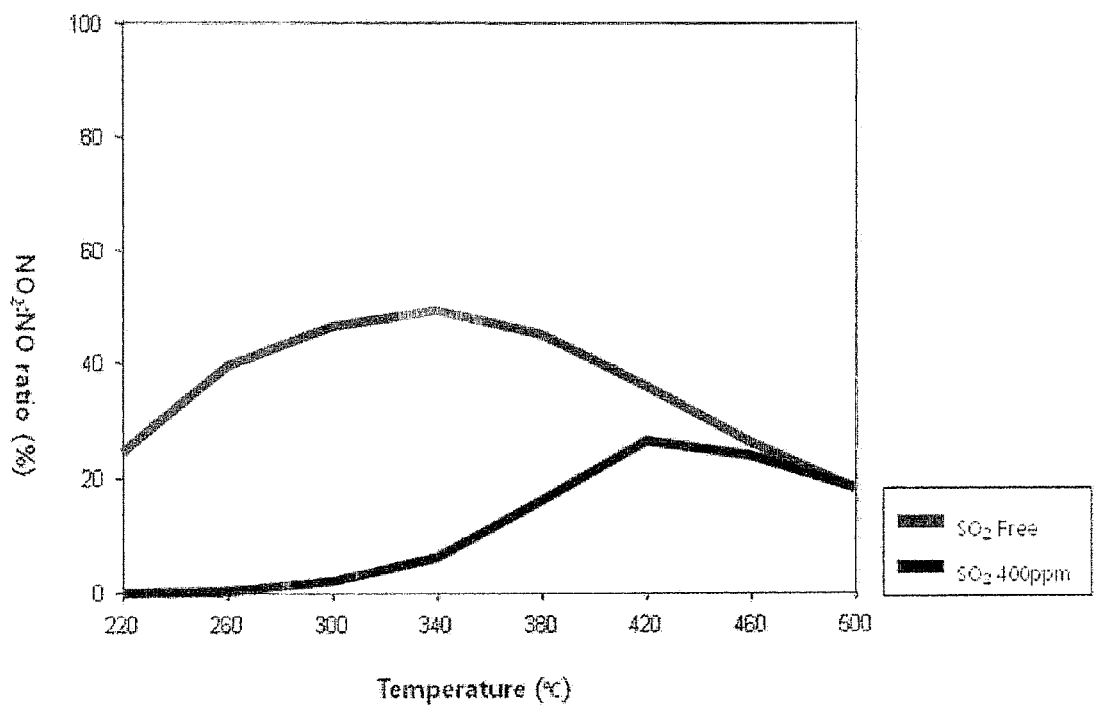

[Figure 7]
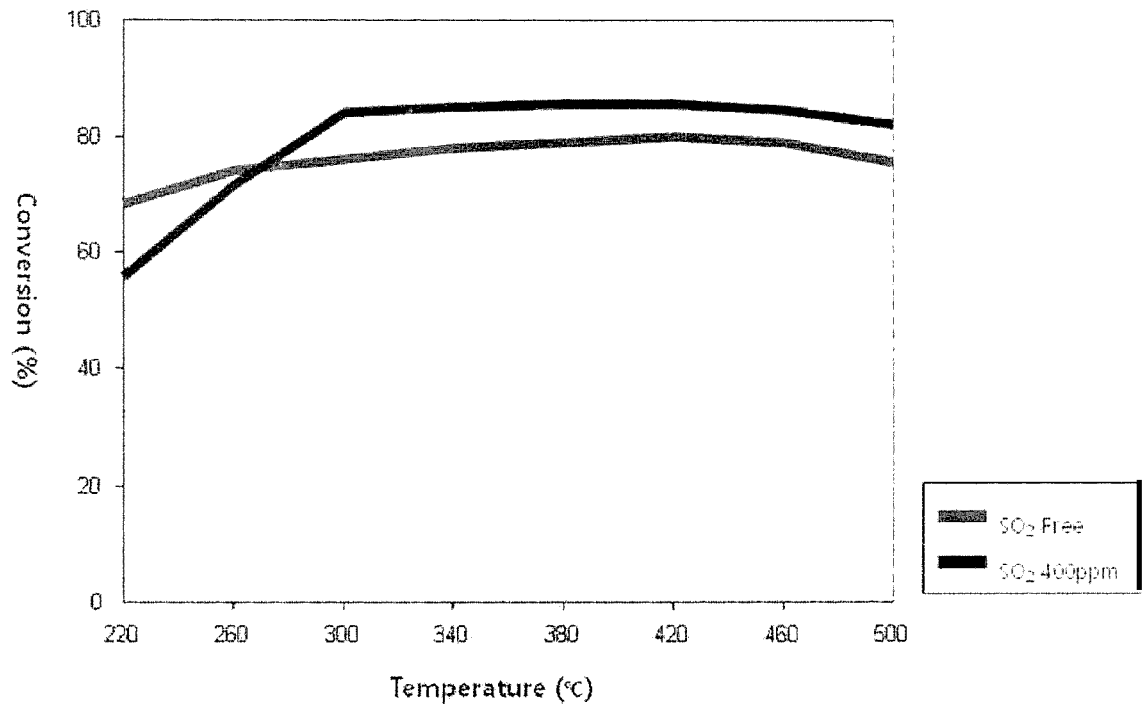
[Figure 8]
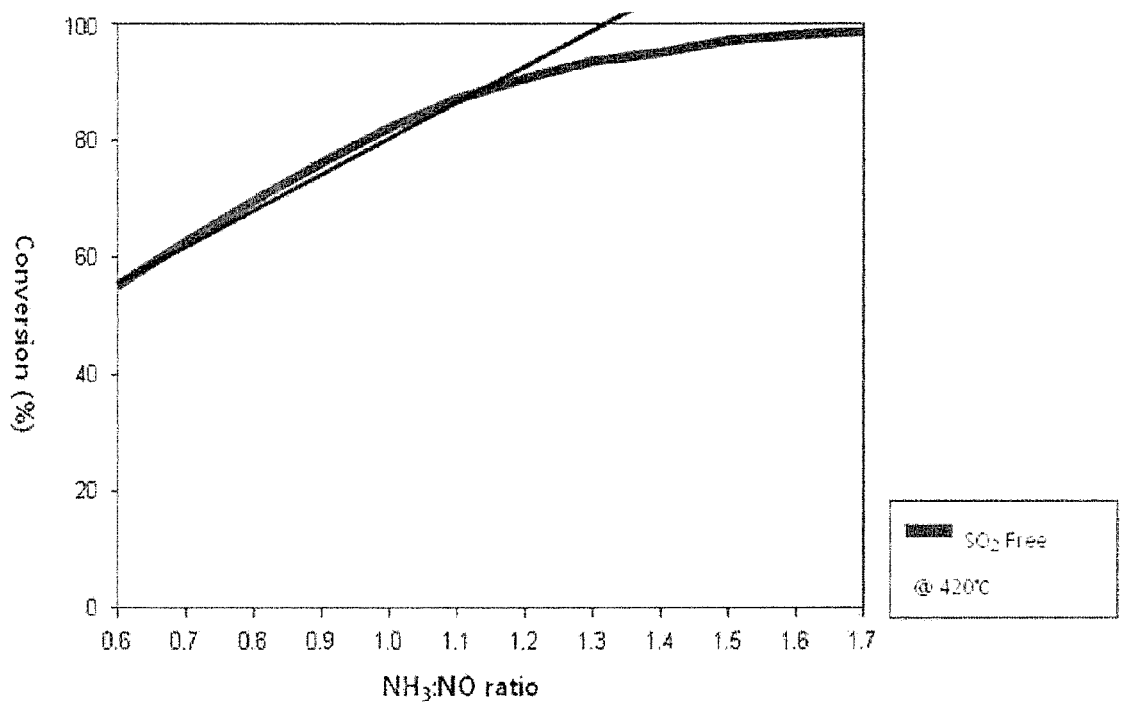

[Figure 9]
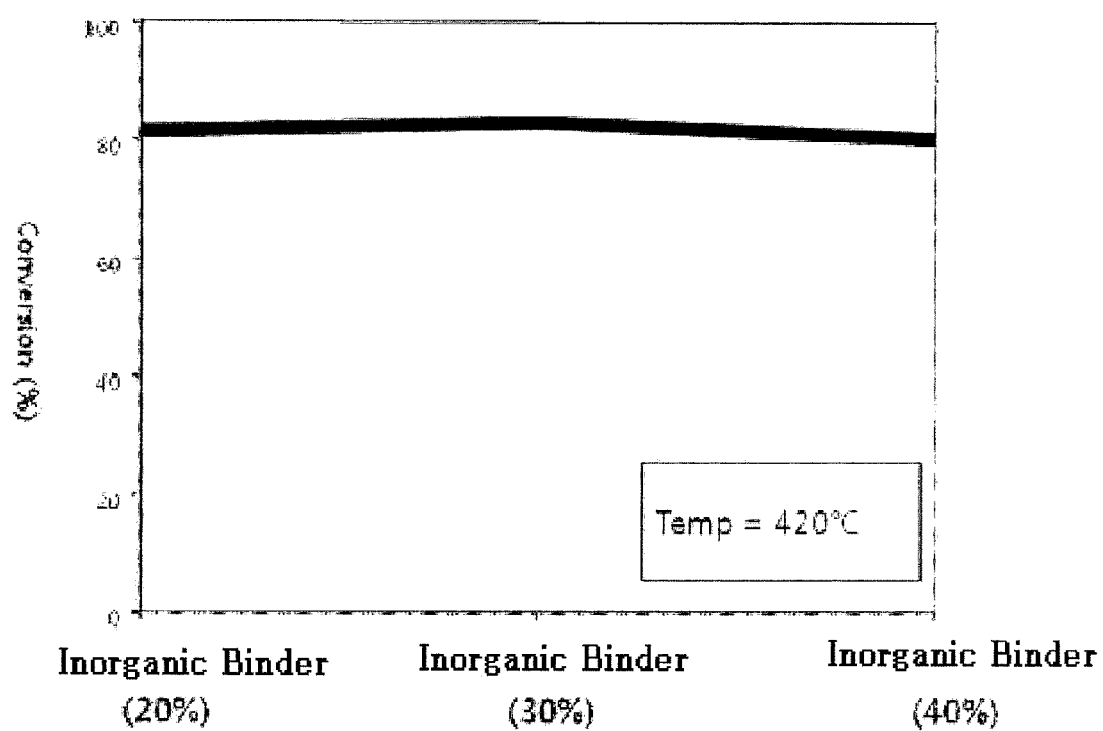

FABRICATION METHOD OF ZEOLITE HONEYCOMB TYPE CATALYST FOR REDUCING NITROGEN OXIDE

TECHNICAL FIELD

The present invention relates to conversion of exhaust gas containing nitrogen oxide ($NO_x$) such as NO, $NO_2$ and $N_2O$ into $N_2$ and $H_2O$ through catalytic reaction with injection of a reducing agent such as ammonia and urea, and more particularly, to a fabrication method of a catalyst for purifying exhaust gas.

BACKGROUND ART

In recent years, there is a globally increasing concern about air pollution due to industrial emission of harmful oxides of sulfur and carbon. Accordingly, an allowable amount of the emission of the one or more pollutants has been regulated and the regulation tends to become stricter.

Treatment of nitrogen oxides is particularly required since the nitrogen based oxides not only is harmful as itself but also produces more harmful secondary pollutants by photochemical reaction in an atmosphere.

Among the conventional catalysts used in the treatment of an exhaust gas containing nitrogen based oxide, there has been reported a catalyst in which metal such as Cu is sulfur-oxidized and impregnated on a silica support as a catalyst having a high $N_2$ reduction ratio (Japanese Patent Publication No. H8-173766).

But, this catalyst has a disadvantage that a volatile sulfuric compound is required to be added to an exhaust gas in order to maintain the metal in a sulfur-oxidized state during the reaction. There has also been a catalyst which impregnates vanadium oxide, tungsten oxide and palladium on titania and/or titania silica (Japanese Patent Publication No. 2001-293480).

But, there is a problem that an activity of the catalyst is sharply lowered at a high temperature (above 400° C.), and the use of this catalyst is regulated due to toxicity of the vanadium.

A catalyst using zeolite as a support or mainly containing zeolite substituted with metal having an activity to nitrogen oxide is fabricated and used in a form of a sphere, a pillar, a granule or a honeycomb. However, the zeolite powder itself has insignificant plasticity and sinterability.

A technology of fabricating a molded body which is not broken by crack upon fabrication of a zeolite support or a zeolite catalyst and has a high specific surface area is therefore very important and has been actively studied.

In one example, an inorganic binder such as natural clay, bentonite, kaolin, colloidal silica or a cellulose based organic binder is added (U.S. Pat. No. 5,116,586), but there is a disadvantage that a performance of the catalyst is notably reduced since it is required to add relatively large amount of inorganic binder and a content of the zeolite in a fabricated zeolite support or zeolite catalyst is consequently lowered.

Particularly, a zeolite honeycomb type support or zeolite catalyst, which can have a high specific surface area, requires high moldability and high physical strength as compared with a sphere or pellet type having a simple structure since it has a structure in that internal pores passing through the molded body are regularly formed and is therefore difficult to be fabricated. Accordingly, a wash coated type zeolite which is fabricated by wet pulverizing zeolite and catalyst materials having an activity to nitrogen oxide and coating them on a surface of previously fabricated structural body with a honeycomb shape has been mainly used.

However, in the wash coated type zeolite, an efficiency of nitrogen oxide removal per unit volume is lower than that of the zeolite honeycomb type extrudate and the efficiency of nitrogen oxide removal is sharply reduced as a catalyst is largely damaged by erosion when used for a long time.

As a solution to the problem of forming a catalyst mainly containing the zeolite, there have been suggested a method in which zeolite is added with polysaccharide and selectively clayey mineral or inorganic fiber, molded in a honeycomb shape and then calcined at 500 to 800° C. (Japanese Patent Publication No. 19995-053208), and a method in which salt treated mesoporous zeolite is mixed with pseudo-boehmite, organic binder, plasticizer and lubricant, aged at a low temperature, molded in a honeycomb shape, dried and then calcined at a high temperature (Korean Patent Publication No. 2004-0063630).

In the method disclosed in Korean Patent Publication No. 2004-0063630, pseudo-boehmite is used as an inorganic binder like the present invention, but zeolite, inorganic binder, plasticizer and lubricant are simultaneously kneaded and molded. Therefore, shape retention and fine moldability of a molded body is still insufficient.

From numerous experiments and hard work, the present inventors have been found that gelatinization of the pseudo-boehmite used as an inorganic binder is the most important factor determining viscosity and strength (moldability of ultra fine structure) of paste allowing the fabrication of a zeolite honeycomb type extrudate with high specific surface area and an ultra fine porous structure in which a wall thickness between internal pores is 0.1 to 2 mm and the factor determining damage by crack generated upon dry and heat treatment. The present inventors have also been found that the gelatinization of the pseudo-boehmite is sensitively varied as pH, moisture content and time taken to perform the gelatinization and quality of the molded body (e.g. macro crack and damage) is varied as the step of performing the gelatinization, and thereby reached the present invention. In addition, the present inventors have been found that gelatinization in a basic state is very effective, and thereby reached the present invention.

DISCLOSURE

Technical Problem

An object of the present invention is to provide a zeolite honeycomb type catalyst with a high specific surface area for reducing nitrogen oxide, having high efficiency of nitrogen oxide removal at a high temperature (400° C.) which is the weak point of conventionally used $V_2O_5/WO_3$ and $(MoO_3)/TiO_2$, utilizable for a mobile purpose since it has no toxicity in the catalytic components, and installable in a nitrogen oxide generating facility ($NO_x$, generating source including a power plant) where the use of a vanadium catalyst is not allowed, a fabrication method of the catalyst, and a treatment method of exhaust gas containing nitrogen oxide using the catalyst.

In particular, another object of the present invention is to provide a fabrication method of a zeolite honeycomb type extrudate of an ultra fine porous structure having a high specific surface by addition of pseudo-boehmite as an inorganic binder with optimal gelatinization condition of the pseudo-boehmite.

Technical Solution

A zeolite honeycomb type catalyst with a high specific surface area for reducing nitrogen oxide, a fabrication method of the catalyst, and a treatment method of exhaust gas containing nitrogen oxide using the catalyst will be described in detail. Unless defined otherwise, all technical and scientific terms used herein have the same meaning as commonly understood by one of ordinary skill in the art to which the present invention belongs. Also, well-known functions or constructions which may unnecessarily obscure the subject matter of the present invention will not be described in detail.

A fabrication method of zeolite honeycomb type catalyst for reducing nitrogen oxide includes: (a) obtaining an inorganic binder by mixing and uniformly peptizing pseudo-boehmite, distilled water and a pH adjuster; (b) obtaining a paste by mixing and kneading zeolite, the inorganic binder, an organic binder and distilled water; (c) extruding the paste into an extrudate having a through pore of a regular structure; and (d) drying and heat treating the extrudate.

As described above, the fabrication method of a honeycomb type catalyst for reducing nitrogen oxide is characterized in that the peptization is not performed with the pseudo-boehmite being mixed with the zeolite and the organic binder, but is performed in an independent step. The independent peptization of the pseudo-boehmite in the step (a) is performed under adjusted pH, adjusted mixing amount of the distilled water and adjusted peptization time to increase moldability and strength of the paste in the step (b), thereby capable of fabricating a zeolite honeycomb type molded body of an ultra fine structure.

Damage of the molded body upon drying and heat treatment of the molded body is also prevented by the independent peptization of the pseudo-boehmite in the step (a).

More specifically, it is impossible to fabricate a honeycomb shaped extrudate having a fine pitch (a distance between centers of the adjacent pores) due to an excessive shear stress when the peptization of the pseudo-boehmite is excessive and the shape of the extrudate is collapsed as a physical strength of the extrudate is too weak when the peptization of the pseudo-boehmite is insufficiently performed.

Accordingly, it is necessary to highly adjust a degree of peptization and it is possible, by this adjustment, to fabricate a zeolite honeycomb type extrudate with a high specific surface area and an ultra fine porous structure in which wall thickness between the internal pores is 0.1 to 2 mm In order for the highly adjusted peptization of the pseudo-boehmite, it is necessary to fabricate an inorganic binder not upon mixing in the step (b) but in a separate peptization step such as the step (a), and a pH at which the peptization is performed, an amount of the distilled water to be added and time for which the peptization is performed should be determined.

If the peptization of the pseudo-boehmite is performed in the step (b), moldability and strength are not so high, it is impossible to fabricate the honeycomb type extrudate having an ultra fine structure, there is high possibility of generation of fine crack during an extrusion process and damage rate is increased during drying and heat treating the extrudate.

The pH adjuster in the step (a) is a monovalent acid, ammonium hydroxide, an amine compound or a mixture thereof.

The monovalent acid is preferably acetic acid, nitric acid or a mixed acid thereof, and the amine compound is preferably a primary amine, secondary amine or a mixture thereof. Also, the amine compound is preferably alcohol amine having alcohol group. Using the pH adjuster, the peptization in the step (a) is preferably performed under acidic condition of pH 0.5 to 6 or basic condition of pH 8 to 11.

Even under the basic condition of pH 8 to 11, it is preferable to adjust the pH in the state that the monovalent acid such as acetic acid and nitric acid is added. It is most preferable that the acidic condition of pH 0.5 to 6 is adjusted by adding acetic acid, nitric acid or a mixed acid thereof and the basic condition of pH 8 to 11 is adjusted by adding ammonium hydroxide together with acetic acid, nitric acid or a mixed acid thereof. When the pH is adjusted to the basic condition of pH 8 to 11 by addition of the monovalent acid and the base (ammonium hydroxide, an amine compound or a mixture thereof), the monovalent acid is preferably added by 1 to 5 parts by weight for the 100 parts by weight of the zeolite.

In the acidic or basic condition of the aforementioned range, the distilled water is preferably used by 100 to 500 parts by weight for the 100 parts by weight of pseudo-boehmite.

In the acidic condition of pH 0.5 to 4 or the basic condition of pH 8 to 11, the peptization is performed preferably for 10 to 40 minutes. If the peptization is performed for below 10 minutes or over 40 minutes in the acidic condition of pH 0.5 to 4, specifically pH 0.5 to 3.5 or the basic condition of pH 8 to 11, a physical strength of the extrudate is to weak, and therefore a shape of the extrudate is collapsed or the extrudate with broken shape is fabricated by a stress upon extrusion. In the acidic condition of pH 4 to 6, the peptization is performed preferably for 2 to 4 days. A physical strength of the extrudate is too weak and a shape of the extrudate is therefore collapsed if the peptization is performed for below 2 days. On the contrary, variation in a degree of the peptization of the pseudo-boehmite is insignificant if the peptization is performed for over 4 days.

Through the aforementioned condition, dispersibility and particle size of the peptized pseudo-boehmite are determined and gel containing the peptized pseudo-boehmite is finally prepared.

The inorganic binder containing the pseudo-boehmite peptized under the aforementioned condition is mixed in the zeolite together with the organic binder.

It is preferable that 10 to 150 parts by weight of the inorganic binder, 1 to 15 parts by weight of the organic binder and 30 to 100 parts by weight of the distilled water are added and mixed for 100 parts by weight of zeolite. The mixing can be performed using a conventional mixing method used to fabricate an extrusion molded body, and it is preferable that a primary dry mixing is performed with addition of the zeolite and the organic binder and a secondary wet mixing is then performed with addition of the inorganic binder and the distilled water.

After completion of the mixing, kneading is preferably performed in order to obtain uniform physical properties.

Upon the mixing, 0 to 150 parts by weight of one or more inorganic substances with a fiber or particle shape selected from the group consisting of Si, Al, Ti, Zr, $SiO_2$, $Al_2O_3$, $TiO_2$ and $ZrO_2$ can be further added. The inorganic substances acts to increase additionally increase the physical strength of the paste.

When the inorganic substances is in the range of 0 to 150 parts by weight, the paste not only has increased physical strength but also has a viscosity suitable for extrusion molding, and the properties of the catalyst is not degraded.

To obtain substantial increase in the strength by the addition of the inorganic substances, it is preferred to add more than 10 parts by weight of inorganic substances for 100 parts by weight of zeolite.

In the present invention, both natural zeolite and artificially synthesized zeolite can be used as the zeolite fabricated into a honeycomb type extrudate, and a mole ratio of $SiO_2/Al_2O_3$ in the zeolite is preferably 25 to 35 though the zeolite can have a variety of mole ratios of $SiO_2/Al_2O_3$.

Also, the zeolite can be, for example, zeolite ion exchanged with a metal having an activity to nitrogen oxide (hereinafter, referred to as active metal) or zeolite impregnated with the active metal.

The active metal is preferably one or more metals selected from transition metal and lanthanides, and more preferably selected from the group consisting of Fe, Cu, Co, Pt, V, Ce and Mo.

The zeolite is preferably MFI, β, Y or a mixed form thereof, and more preferably MFI, β, Y or a mixed form thereof substituted with one or more metals selected from the group consisting of Fe, Cu, Co, Pt, V, Ce and Mo.

As the organic binder, all organic binders conventionally added to inorganic paste for the fabrication of an extrudate can be used. The organic binder is preferably ethylcellulose group, methylcellulose group, an ethylcellulose derivative, a methylcellulose derivative or a mixture thereof, and more preferably the methylcellulose group. The organic binder acts to increase moldability upon extrusion and lessen generation of a crack upon dry.

During the extrusion in the step (c), it is preferable that an inside of the extruder is maintained at vacuum state and molding is performed at a speed of 300 to 500 mm/min.

While it is possible to use both cylinder type extruder and piston type extruder for the extrusion, it is preferred to use the cylinder type extruder in order to allow continuous process. The molding speed is a speed optimized for the condition of the paste in the step (b), at which speed fabrication efficiency is increased and at the same time the honeycomb type extrudate is not damaged by the excessive stress applied during the extrusion.

As the viscosity and strength of the paste is optimized by the optimized peptization condition in the step (a) and optimized mixing condition and mixing ratio in the step (b), it is possible to obtain, in the step (c), a honeycomb type extrudate with a high specific surface area in which fine pores having circular or polygonal section and passing through the extrudate in a major axis direction are regularly arranged.

Through the extrusion, it is possible to obtain high quality extrudate having the regular structure and a wall thickness between the pores of 0.1 to 2 mm.

The honeycomb type extrudate fabricated through the above extrusion process is dried at below 100° C. under constant temperature and humidity conditions and then calcined (heat treated) at a temperature of 100 to 600° C., thereby capable of fabricating the honeycomb type catalyst for reducing nitrogen oxide. In order to prevent generation of cracks due to the heat treatment, two stage heat treatment in that high temperature heat treatment at 400 to 600° C. is performed after low temperature heat treatment at 100 to 150° C. is preferably performed.

The honeycomb type catalyst for reducing nitrogen oxide fabricated by the method of the present invention as described above and exhaust gas containing nitrogen oxide ($NO_x$), one or more substances selected from NO, $NO_2$, $N_2O$ are brought in contact with each other at 200 to 500° C. with injection of a reducing agent such as ammonia and urea, thereby capable of reducing the nitrogen oxide.

The exhaust gas may contain sulfur dioxide and the exhaust gas which is brought in contact with the honeycomb type catalyst for reducing nitrogen oxide preferably has, though not particularly limited, a spatial speed of below 100,000/h

Advantageous Effects

According to the present invention, it is possible to fabricate a honeycomb type catalyst having through pores of a regular structure with solid state and high yield. It is also possible to fabricate a catalyst with a high specific surface area since it is possible to fabricate a honeycomb shape having fine through pores and a small interpore pitch. In treatment of exhaust gas using the honeycomb type catalyst fabricated by the method of the present invention, degradation in catalyst properties by used inorganic binder is not occurred and a high $N_2$ conversion rate of over 80% is exhibited at a low temperature of 300° C., particularly at a high temperature of over 400° C.

DESCRIPTION OF DRAWINGS

The above and other objects, features and advantages of the present invention will become apparent from the following description of preferred embodiments given in conjunction with the accompanying drawings, in which:

FIG. 1 shows an example of a honeycomb shape fabricated through the method of the present invention;

FIG. 2 is an optical photograph showing an extrudate in a drying step of Example 1 of the present invention;

FIG. 3 is an optical photograph showing an inorganic binder of Comparative Example 2;

FIG. 4 is an optical photograph showing an extrusion step of Comparative Example 2;

FIG. 5 is a structural view showing an apparatus for measuring properties of treating exhaust gas containing nitrogen oxide;

FIG. 6 is a graph showing the results of measuring ratios of $NO_2$:NO in the exhaust gases with 400 ppm of $SO_2$ gas and no $SO_2$ gas injection, respectively;

FIG. 7 is a graph showing the results of measuring $N_2$ conversion rates of the exhaust gases with 400 ppm of $SO_2$ gas and no $SO_2$ gas injection, respectively;

FIG. 8 is a graph showing the result of measuring a $N_2$ conversion rate of the exhaust gas according to an injection amount of ammonia gas, with no $SO_2$ gas injection and a fixed reaction temperature of 420° C.; and FIG. 9 is a graph showing the result of measuring a $N_2$ conversion rate of the exhaust gas according to an addition amount of an inorganic binder of the present invention.

BEST MODE

Practical and presently preferred embodiments of the present invention are illustrative as shown in the following Examples.

However, it will be appreciated that those skilled in the art, on consideration of this disclosure, may make modifications and improvements within the spirit and scope of the present invention.

Zeolite used in Examples and Comparative Examples below is a MFI type zeolite ion exchanged with 5% by weight of Fe metal having an activity to nitrogen oxide.

EXAMPLE 1

Fabrication of a Honeycomb Type Catalyst for Reducing Nitrogen with a Pitch of 6.6 mm Using Pseudo-boehmite Peptized Under a Condition of pH 10

To 100 g of pseudo-boehmite (SASOL), 330 g of distilled water, 1.5 g of acetic acid (Sigma Aldrich, 99.8%+) and ammonia water of 16% molarity were added and adjusted to pH 10, followed by stirring for 30 minutes to perform peptization of the pseudo-boehmite, thereby preparing an inorganic binder.

To 500 g of MFI type zeolite (Süd-Chemical), 15 g of methylcellulose was added and dry mixing was performed, and 100 g of the inorganic binder and 400 g of distilled water were then added and wet mixing was performed. After the wet mixing, the mixture was kneaded to prepare paste.

The prepared paste was put into a cylinder type extruder to fabricate an extrudate at a molding speed of 400 mm/min with the inside of the extruder being maintained in a vacuum state and a rotational speed of a cylinder being maintained 50 rpm. The fabricated extrudate was dried for 12 hours at 65° C. and then dried again for 12 hours at 80° C. The dried extrudate was heat treated for 2 hours at 120° C. using a furnace and then heat treated again for 3 hours at 500° C. to fabricate a honeycomb type catalyst for reducing nitrogen oxide having a shape as shown in FIG. 1 and a pitch (a distance between centers of pores) of 6.6 mm.

FIG. 2 is a photograph showing the extrudate in the drying step. Physical dimensions of the fabricated honeycomb type catalyst for reducing nitrogen oxide are shown in Table 1 below.

TABLE 1

| Dimension | FIG. 1 | Unit | Value |
| --- | --- | --- | --- |
| Length | a | mm | 250 |
| Width | b | mm | 21.3 |
| Opening | c | mm | 5.5 |
| Wall thickness | d | mm | 1.1 |
| Pitch | c + d | mm | 6.6 |
| Surface area | | $m^2/m^2$ | 436.4 |

EXAMPLE 2

Fabrication of a Honeycomb Type Catalyst for Reducing Nitrogen with a Pitch of 6.6 mm Using Pseudo-boehmite Peptized Under a Condition of pH 1.5

A honeycomb type catalyst for reducing nitrogen oxide with a pitch of 6.6 mm was fabricated by the same manner as in Example 1, except that, in the step of paste preparation of Example 1, nitric acid (Sigma Aldrich, 60%) was added instead of the acetic acid and the ammonia water and adjusted to pH 1.5, followed by stirring for 20 minutes to prepare an inorganic binder.

EXAMPLE 3

Fabrication of a Honeycomb Type Catalyst for Reducing Nitrogen with a Pitch of 2.1 mm Using Pseudo-boehmite Peptized Under a Condition of pH 1.5

A honeycomb type catalyst for reducing nitrogen oxide with a pitch of 2.1 mm was fabricated using the inorganic binder prepared using nitric acid in Example 2 under the same conditions of extrusion, drying and calcination as in Example 1. Physical dimensions of the fabricated honeycomb type catalyst for reducing nitrogen oxide are shown in Table 2 below.

TABLE 2

| Dimension | FIG. 1 | unit | Value |
| --- | --- | --- | --- |
| Length | a | mm | 250 |
| Width | b | mm | 22.2 |
| Opening | c | mm | 1.6 |
| Inner Wall thickness | d | mm | 0.5 |
| Pitch | c + d | mm | 2.1 |

TABLE 2-continued

| Dimension | FIG. 1 | unit | Value |
| --- | --- | --- | --- |
| Outer Wall thickness | e | mm | 0.8 |
| Surface area | | $m^2/m^2$ | 1300 |

EXAMPLE 4

Fabrication of Honeycomb Type Catalysts for Reducing Nitrogen with a Pitch of 6.6 mm According to Addition Amount Of the Inorganic Binder A honeycomb type catalyst for reducing nitrogen oxide with a pitch of 6.6 mm containing 30% by weight of the inorganic binder and a honeycomb type catalyst for reducing nitrogen oxide with a pitch of 6.6 mm containing 40 by weight of the inorganic binder were fabricated by the same manner as in Example 1, except that the inorganic binder prepared in Example 1 was added by 150 g and 200 g to prepare the paste, respectively.

COMPARATIVE EXAMPLE 1

Extrusion Properties of a Paste Containing No Inorganic Binder

To 500 g of MFI type zeolite (Sud-Chemical), 15 g of methylcellulose was added and dry mixing was performed, and 300 g of distilled water was then added and wet mixing was performed. After the wet mixing, the mixture was kneaded to prepare paste. The prepared paste was put into a cylinder type extruder to perform extrusion at a molding speed of 400 mm/min with the inside of the extruder being maintained in a vacuum state and a rotational speed of a cylinder being maintained 50 rpm. As the result, an amorphous extrudate which could not be extruded in a honeycomb shape and lost its shape due to degradation in strength was obtained.

COMPARATIVE EXAMPLE 2

Extrusion Properties of Pseudo-Boehmite Peptized Under Strong Basic Condition (pH=12)

To 100 g of pseudo-boehmite, 330 g of distilled water, 1.5 g of acetic acid and ammonia water of 16% molarity were added and adjusted to pH 12, followed by stirring for 30 minutes to perform peptization of the pseudo-boehmite, thereby preparing an inorganic binder. FIG. 3 is an optical photograph showing pseudo-boehmite peptized under a strong basic condition. Paste was prepared by the same manner as in Example 1 except that the inorganic binder. The prepared paste was put into a cylinder type extruder to perform extrusion at a molding speed of 400 mm/min with the inside of the extruder being maintained in a vacuum state and a rotational speed of a cylinder being maintained 50 rpm. As the result, a honeycomb shaped extrudate could not be obtained as shown in FIG. 4.

A testing apparatus was constructed in order to measure performance of treating exhaust gas containing nitrogen oxide of the catalyst fabricated by the method of the present invention. To form various kinds of exhaust gases, gases of $N_2$, $O_2$, NO, $SO_2$ are respectively controlled with MFC and mixed in a gas mixer.

The mixed gas is heated to a reaction temperature by a pre-heater. Just before the mixed gas with increased temperature is introduced in a reactor, $NH_3$ of which flow rate is controlled with the MFC is injected and a catalyst mounted in the reactor is brought into contact with the mixed gas heated to the reaction temperature and ammonia to perform conversion of nitrogen oxide into $N_2$. Gas exhausted to the rear end with generation of the reaction was sampled to perform evaluation of catalyst properties. Reduction into $N_2$ is performed in a state that the reactor is also maintained at the reaction temperature.

To this end, the honeycomb type catalyst for reducing nitrogen oxide with a pitch of 2.1 mm which was fabricated in Example 3 was cut to a size of 25 mm×25 mm×250 mm and mounted in the reactor. Results in FIGS. 6 to 8 were measured. Detailed test conditions using the test apparatus in FIG. 5 are shown in Table 3 below

TABLE 3

| Reaction Parameter | |
|---|---|
| Space Velocity | 20,000/h |
| Catalyst Temperature | 220~500° C. |
| Inlet Flue Gas Parameter | |
| [NO]dry | 200 ppm |
| [SO$_2$]dry | — |
|  | 400 ppm |
| [O$_2$]dry | 5% |
| [NH3]/[NO] | 1.0 |
| [N$_2$] | Balance |

FIG. 6 is a graph showing the results of measuring a ratio of $NO_2$:NO in the exhaust gases with 400 ppm of $SO_2$ gas and no $SO_2$ gas injection, respectively.

As can be appreciated from the results of FIG. 6, oxidation of NO is occurred in an oxygen atmosphere with no sulfur dioxide injection. With sulfur dioxide injection, the oxidation of NO is reduced at a low temperature but is occurred to an extent similar to the oxygen atmosphere at a high temperature.

FIG. 7 is a graph showing the results of measuring $N_2$ conversion rates of the exhaust gases with 400 ppm of $SO_2$ gas and no $SO_2$ gas injection, respectively. As can be appreciated from the results of FIG. 7, an efficiency of nitrogen oxide (NO, $NO_2$) removal is increased and $N_2$ conversion rate of over 80% is exhibited at a low temperature of 300° C. with $SO_2$ gas injection.

FIG. 8 is a graph showing the result of measuring a $N_2$ conversion rate of the exhaust gas in a case that a ratio of an injection amount of ammonia gas to 200 ppm of NO is 0.6 to 1.7 with no $SO_2$ gas injection under the condition of Table 3 and a fixed reaction temperature of 420° C. As can be appreciated from the result of FIG. 8, an effect of reducing nitrogen oxide is increased as the amount of ammonia gas is increased and, particularly, over 95% of nitrogen oxide is removed when the ratio of the injection amount of the ammonia gas is over 1.4.

FIG. 9 is a graph showing the result of measuring a $N_2$ conversion rate of the exhaust gas with no $SO_2$ gas injection under the condition of Table 3 and a fixed reaction temperature of 420° C., after cutting the honeycomb type catalyst for reducing nitrogen oxide with a pitch of 6.6 mm containing 30% by weight of the inorganic binder and the honeycomb type catalyst for reducing nitrogen oxide with a pitch of 6.6 mm containing 40% by weight of the inorganic binder prepared in Example 4, and the honeycomb type catalyst for reducing nitrogen oxide with a pitch of 6.6 mm prepared in Example 1 to a size of 25 mm×25 mm×250 mm and mounting them in the reactor, respectively. As can be appreciated from the result of FIG. 9, the properties of nitrogen oxide reduction are not degraded in spite that an amount of the added inorganic binder is increased.

Those skilled in the art will appreciate that the conceptions and specific embodiments disclosed in the foregoing description may be readily utilized as a basis for modifying or designing other embodiments for carrying out the same purposes of the present invention.

Those skilled in the art will also appreciate that such equivalent embodiments do not depart from the spirit and scope of the invention as set forth in the appended claims.

The invention claimed is:

1. A fabrication method of zeolite honeycomb type catalyst for reducing nitrogen oxide, comprising:
    (a) obtaining an inorganic binder by mixing and uniformly peptizing pseudo-boehmite, distilled water and a pH adjuster;
    (b) obtaining a paste by mixing and kneading zeolite, the inorganic binder, an organic binder and distilled water;
    (c) extruding the paste into an extrudate having a through pore of a regular structure; and
    (d) drying and heat treating the extrudate.

2. The method as set forth in claim 1, wherein the peptization in the step (a) is performed with addition of 100 to 500 parts by weight of distilled water for 100 parts by weight of pseudo-boelunite.

3. The method as set forth in claim 2, wherein the peptization in the step (a) is performed under acidic condition of pH 0.5 to 6 or basic condition of pH 8 to 11.

4. The method as set forth in claim 3, wherein the peptization in the step (a) is performed for 10 to 40 minutes under acidic condition of pH 0.5 to 4 or basic condition of pH 8 to 11.

5. The method as set forth in claim 3, wherein the peptization in the step (a) is performed for 2 to 4 days under acidic condition of pH 4 to 6.

6. The method as set forth in claim 1, wherein the pH adjuster is one or more acids selected from monovalent acid group; one or more bases selected from ammonium hydroxide and amine compounds; or a mixture of the acid and the base.

7. The method as set forth in claim 4, wherein the basic condition of pH 8 to 11 is adjusted by one or more acids selected from monovalent acid group and one or more bases selected from ammonium hydroxide.

8. The method as set forth in claim 1, wherein, in the mixing in the step (b), 10 to 150 parts by weight of the inorganic binder, 1 to 15 parts by weight of the organic binder and 30 to 100 parts by weight of the distilled water are added for 100 parts by weight of the zeolite.

9. The method as set forth in claim 1, wherein the zeolite in the step (b) is zeolite which is ion exchanged or impregnated with one or more metals selected from transition metal and lanthanides.

10. The method as set forth in claim 9, wherein the metal is one or more selected from the group consisting of Fe, Cu, Co, Pt, V, Ce and Mo.

11. The method as set forth in claim 1, wherein the past in the step (b) further includes 0 to 150 by weight of one or more inorganic substances with a fiber or particle shape selected from the group consisting of Si, Al, Ti, Zr, $SiO_2$, $Al_2O_3$, $TiO_2$ and $ZrO_2$.

12. The method as set forth in claim 1, wherein the pore in the step (c) has polygonal or circular section and passes through the extrudate in a major axis direction of the extrudate.

13. The method as set forth in claim 1, wherein the heat treatment in the step (d) is performed at a temperature of 100 to 600° C.

14. The method as set forth in claim 1, wherein the organic binder is a methylcellulose group.

15. A honeycomb type catalyst for reducing nitrogen oxide fabricated by the method as set forth in claim 1.

16. A treatment method of exhaust gas containing nitrogen oxide by contacting a honeycomb type catalyst for reducing nitrogen oxide fabricated by the method as set forth in claim 1 and an exhaust gas containing nitrogen oxide and ammonia at a temperature of 200 to 500° C. to convert the nitrogen oxide into $N_2$.

* * * * *